US010120947B2

(12) United States Patent
Kritt et al.

(10) Patent No.: US 10,120,947 B2
(45) Date of Patent: Nov. 6, 2018

(54) PROPAGATION OF PHOTOGRAPHIC IMAGES WITH SOCIAL NETWORKING

(71) Applicant: International Business Machines Corporation, Armonk, NY (US)

(72) Inventors: Barry A. Kritt, Atlantic Beach, NC (US); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 14/510,187

(22) Filed: Oct. 9, 2014

(65) Prior Publication Data

US 2016/0103853 A1   Apr. 14, 2016

(51) Int. Cl.
*G06F 17/30* (2006.01)
*G06Q 30/02* (2012.01)
*G06Q 50/00* (2012.01)

(52) U.S. Cl.
CPC .... *G06F 17/3087* (2013.01); *G06F 17/30265* (2013.01); *G06Q 30/02* (2013.01); *G06Q 50/01* (2013.01); *G06F 17/30038* (2013.01); *G06F 17/30241* (2013.01); *G06F 17/30247* (2013.01); *G06F 17/30867* (2013.01)

(58) Field of Classification Search
CPC ......... G06F 17/30265; G06F 17/30247; G06F 17/3087; G06F 17/30241; G06F 17/30722; G06F 17/30817; G06F 17/30244
USPC ....... 707/758, 724, 736, 737, 741, 743, 748; 382/305, 190, 113
See application file for complete search history.

(56) References Cited

U.S. PATENT DOCUMENTS

| | | | | |
|---|---|---|---|---|
| 8,194,986 B2* | 6/2012 | Conwell | ........... | G06F 17/30265 382/224 |
| 8,238,693 B2* | 8/2012 | Nurminen | ......... | G06F 17/30265 382/286 |
| 8,306,973 B2* | 11/2012 | Ohazama | ............... | G06Q 30/02 707/724 |
| 8,549,437 B2* | 10/2013 | Neubrand | .......... | H04N 1/00204 370/464 |
| 8,655,873 B2* | 2/2014 | Mitchell | ............... | H04W 4/185 707/724 |
| 8,666,112 B1* | 3/2014 | Jing | ........................ | G01C 21/20 382/100 |
| 8,885,960 B2* | 11/2014 | Sauve | ............... | G06F 17/30038 382/244 |
| 9,047,847 B2* | 6/2015 | Hochmuth | ............. | G09G 5/377 |
| 9,125,022 B2* | 9/2015 | DiAcetis | ............... | H04W 4/043 |
| 9,129,179 B1* | 9/2015 | Wong | ........................ | G06K 9/20 |
| 9,405,772 B2* | 8/2016 | Petrou | ............... | G06F 17/30277 |

(Continued)

*Primary Examiner* — Dangelino N Gortayo
(74) *Attorney, Agent, or Firm* — Lieberman & Bransdorfer, LLC (57) ABSTRACT

Embodiments of the invention relate to file sharing, and more specifically to sharing image files based on a social networking relationship. A digital image and associated file are created with geotag data that defines an image capture. Data associated with the image capture is stored as image metadata associated with the image file. A hyperlink to a preferred viewing URL is created and established based on a match produced from a comparison of the image file image capture data with at least one physical location identified in an index of cached data. The hyperlink is associated with the image file and directs a viewer to the physical and/or virtual location where the image was captured.

14 Claims, 8 Drawing Sheets

(56) References Cited

U.S. PATENT DOCUMENTS

| | | | |
|---|---|---|---|
| 2011/0044563 A1* | 2/2011 | Blose | G06F 17/30265 382/306 |
| 2012/0327257 A1* | 12/2012 | O'Keefe | G06F 17/30265 348/222.1 |
| 2013/0046823 A1 | 2/2013 | Mitchell et al. | |
| 2014/0019264 A1 | 1/2014 | Wachman et al. | |
| 2014/0304582 A1* | 10/2014 | Bills | G06F 17/243 715/224 |
| 2016/0119424 A1* | 4/2016 | Kane | G08B 27/001 709/203 |

* cited by examiner

PROPAGATION OF PHOTOGRAPHIC IMAGES WITH SOCIAL NETWORKING

BACKGROUND

This invention relates to sharing of image files. More specifically, the invention relates to associating an image file with a physical address based on a geofence boundary of the physical address and the image file metadata.

With the advent and growth of social media together with electronic image files, there is an increased usage of image file transmission and sharing across a network connection. Image files may be directly communicated and shared through different venues, including, but not limited to electronic mail, social networking, and a shared location. In each of these venues, image files are uploaded to an associated location where the file may be viewed by friends, family, or associates who have been granted access to the file. With electronic mail, the file is uploaded and directly communicated to the recipient. Use of social networking is indirect in that the image file is placed in the associated storage, and the recipient has to access the storage to view or download the image file.

Mechanisms employed for sharing or otherwise accessing image files requires a known relationship between entities, the sender and the recipient in the case of electronic mail, a friendship in the case of social networking, and an exchange of electronic mail addresses in the case of a shared folder. In some cases, a friendship may be established and addresses may be exchanged or otherwise shared for the purpose of accessing image files. However, there is a required level of communication between the sender and the recipient that is established in order to promote the image sharing. Accordingly, various tools are available that allow image files to be electronically stored and accessed, with the access limited to entities that have established a relationship or access authorization.

SUMMARY

The invention includes a method, computer program product, and system for sharing image files in relation to social networking.

A method, computer program product, and system are provided to facilitate file sharing, and in one embodiment propagation of image file data. A device is provided with digital image capturing functionality. Once the image has been captured and an associated file is created, the image can be accessed. The image file may include metadata which contains geotag coordinates identifying the image capture location. An array or index of cached data is reviewed. Each entry in the array includes a set of geotag boundary values which define a geofence for an entity. A comparison of the image file image capture location data with at least one entity geotag boundary location identified in the index of cached data is conducted. In response to a match produced by the comparison, a hyperlink of the preferred viewing URL is created, thereby directing a viewer of the image file to a preferred viewing URL. Accordingly, the hyperlink is associated with the image file and directs a viewer to the preferred viewing URL which is associated with the entity which is proximal to where the image was captured.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
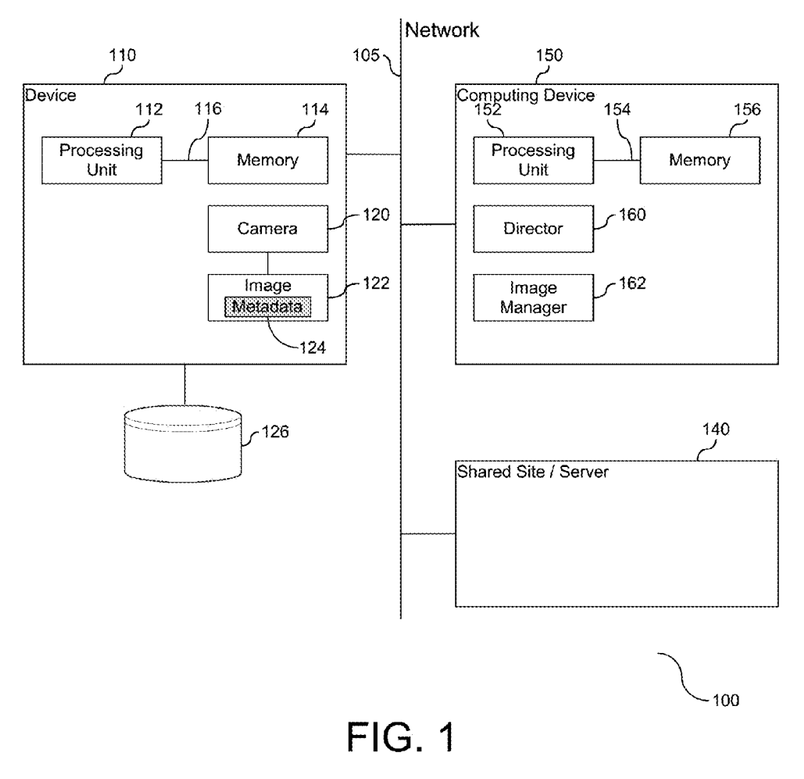
FIG. 1 depicts a block diagram illustrating a system that supports propagation of electronic image files and associating the image files with the subject of the embedded image.

As demonstrated herein, an environment is created for sharing data or image files based on image file metadata. Relationships are established and maintained in social networking, and generally for the purpose of sharing data for various events or milestones. At the same time, virtual establishments or physical establishments with virtual presence may be associated with one or more of the shared images, with the association being intentional or unintentional. With reference to FIG. 1, a block diagram (100) is provided illustrating a system that supports propagation of electronic image files and associating the image files with the subject of the embedded image. As shown, the system (100) is provided with a device (110) that has the functionality to capture an image. In one embodiment, the device is a computing device (110) with a processing unit (112) in communication with memory (114) across a bus (116), and further includes an image capture device, also referred to herein as a camera (120), to produce an image (122). The device (110) includes data storage (126) to store any captured images (122), also referred to as photographic image(s). Although the storage (126) is shown in communication with the device (110), in one embodiment, the storage (126) may be internal to the device (126). In addition, the device (110) is provided with a network connection (105), to enable the device to communicate with a local or wide area network. Accordingly, the system shown herein includes a device that has image capabilities together with network connectivity.

The network connection (105) enables the device (110) to connect to a local or wide area network, and specifically, to send image or data files to a storage location accessible via the network. As an image file is created, aspects of the file are embedded within the image and are referred to herein as image metadata (124). The image metadata (124) includes information related to the image, such as the date and time the image was created, and the size of the image. In one embodiment, the image metadata includes image data location, including one set of geo-coordinates identifying a location from where the image was captured. The image file(s) (122) may be shared through a direct communication of the image file(s) (122), or through social networking or an alternative image file sharing venue. In any of these embodiments, the image file(s) (122) are communicated to a shared site (140), where the image file(s) (122) may be shared privately or publicly.

A computing device (150) is provided in communication with the shared site (140) via a network connection (105). The computing device includes a processing unit (152) in communication with memory (154) across a bus (156). One or more tools are provided in communication with the processing unit (152) to support propagation of the image file(s) (122). More specifically, a web crawler, or an equivalent tool, is known in the art as a program or automated script which browses the Internet in a methodical, and in one embodiment, an automated manner. In one embodiment, the web crawler visits web sites, reads web site data, and creates entries for a search engine index based on the read data. One of the tools is referred to herein as a director (160) and it functions to create a cached index of sets of data with each set containing geofence boundaries and associated preferred viewing URLs (uniform resource locators). In one embodiment, the index may be organized by a physical location of one or more entities based on the entity geofence boundary information in cached data. For example, in one embodiment, the index is sorted based on the entity geotag boundary values. In addition to the director (160), an image manager (162) is provided in communication with the processing unit. The image manager (162) functions to ascertain a match of the image geo-coordinate(s) with a geo-fence boundary identified by the director (160) in the index of cached data. In one embodiment, the image manager (162) compares the image file capture location data with one or more geotag values identified in the array. Based upon finding a match, the image manager (162) establishes a hyperlink to a preferred viewing URL for the matching website. A preferred viewing URL is a URL that a web site owner or administrator has defined in advance to be preferably shown when a user views one or more images taken in proximity to a geofence that the web site owner has also defined. In one embodiment, the definition of both the preferred viewing URL and the geofence are contained within a web page create by the web site owner, and is accessible to web crawlers. Accordingly, the tools (160) and (162) function to associate the image file(s) (122) with a web site, and/or a preferred viewing URL.

As shown herein, an image file (122) is created and stored as a file. The image file (122) includes metadata (124) embedded therein; with the metadata (124) identifying the image together with the locale where the device is located at the time the image is created. Accordingly, the image files for images created by the device camera (120) include metadata (124) identifying the device (110) and the location where the image file was captured.

In addition to establishing a hyperlink between the image file(s) (122) and the preferred viewing URL, the image manager (162) includes the functionality to display an image file(s) (122) along with a hyperlink to the preferred viewing URL. More specifically, when the image file(s) (122) is accessed, an image, icon, or equivalent aspect representing the preferred viewing URL is positioned adjacent to the image. In one embodiment, the image may capture photographic data adjacent to the physical location of the camera, which may be defined by different geographic coordinates. As such, in one embodiment, the image manager (162) may set a virtual boundary range. More specifically, the image manager (162) may define the virtual boundary range for the identified location in the image metadata (124). The range includes a variation of latitude and longitude coordinates as a coordinate scheme for locating the physical geographic position associated with the metadata. Accordingly, the image manager (162) correlates the boundary with the image file metadata.

The tools shown herein embedded within the device (150) employ the processing unit (152) and memory (154) to support file sharing. The tools (160) and (162) are shown residing in memory (154) of the device (150). In one embodiment, the tools (160) and (162) may be implemented as a combination of hardware and software, and in communication with a shared pool of resources. Similarly, in one embodiment, the tools (160) and (162) may be combined into a single functional item that incorporates the functionality of the separate items. For example, the tools (160) and (162) may be embodied as an application in communication with the processing unit (152) and memory (154). As shown herein, each of the tools (160) and (162) are shown local to the device (150). However, in one embodiment, they may be collectively or individually distributed across a shared pool of configurable computer resources and function as a unit to support file sharing. Accordingly, the tools may be implemented as software tools, hardware tools, or a combination of software and hardware tools.

The described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The device described above in FIG. 1 has been labeled with tools in the form of managers. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, a manager of executable code could be a single instruction, or many instructions, and may even be distributed over several different code segments, among different applications, and across several memory devices. Similarly, operational data herein may be identified and illustrated within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 2:
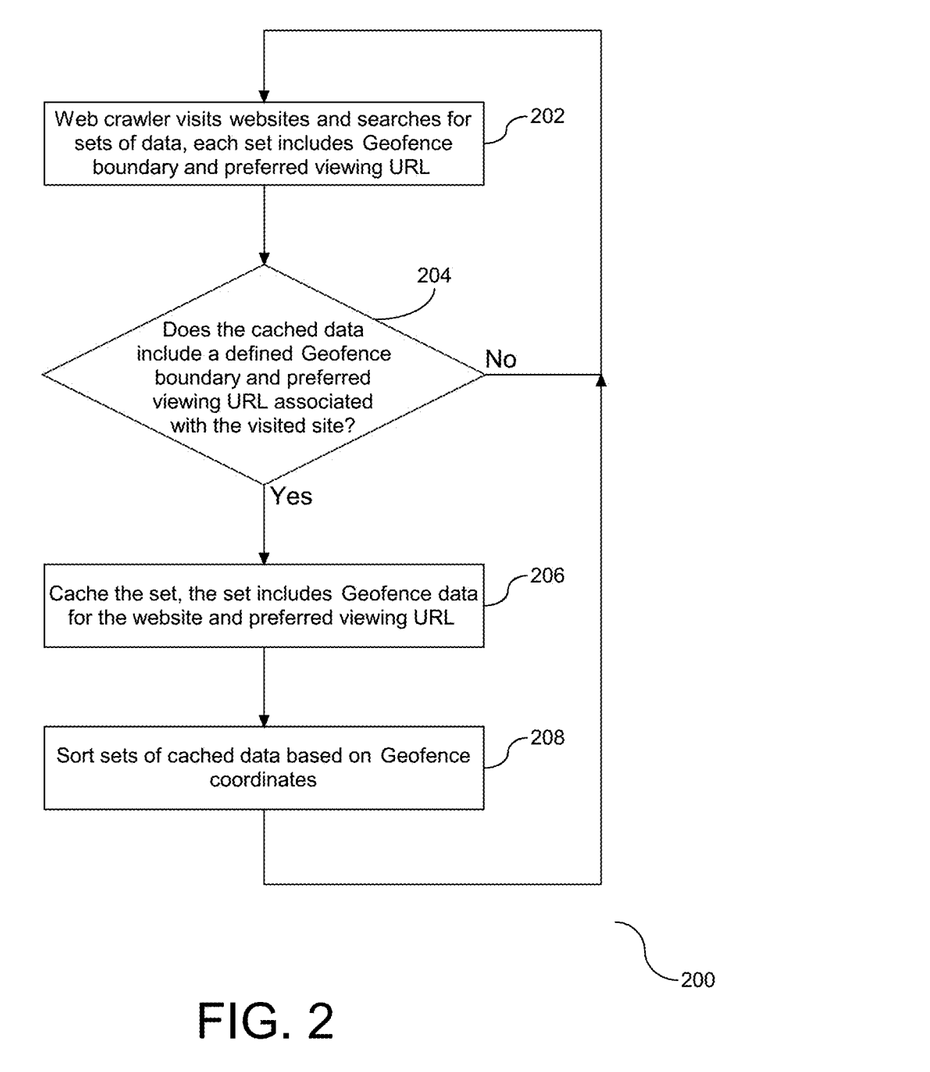
FIG. 2 depicts a flow chart illustrating a process for caching web site data, and specifically defined geofence data associated with web sites.

It is understood and recognized with the proliferation of electronic media that electronic image files are commonly shared on one or more social media venues. Referring to FIG. 2, a flow chart (200) is provided illustrating a process for caching web site data, and specifically defined geofence data associated with web sites. A web crawler is a program or automated script which browses the Internet in a methodical, and in one embodiment, an automated manner. In one embodiment, the web crawler visits web sites, reads web site data, and creates entries for a search engine index based on the read data. As shown herein, a web crawler visits one or more web sites and searches for sets of data (202). In one embodiment, each set includes a geofence boundary and a preferred viewing uniform resource locator (URL). In one embodiment, the geofence boundary is defined by a set of geotags for each preferred viewing URL, with the geotags includes a boundary of latitude and longitude as a coordinate scheme for locating a physical geographic position associated with the geofence. It is then determined if the cached data includes a defined geofence boundary and a preferred viewing uniform resource locator (URL) associated with the visited site (204). A negative response to the determination at step (204) limits the caching to the web site, and the process returns to step (202). However, a positive response to the determination at step (204) is followed by caching the data set, the cached data including geofence data for the web site and the preferred advertising URL (206). In one embodiment, the cached data is indexed by latitude and longitude data. Following step (206), the cached sets of data are sorted based on the geofence coordinates (208), followed by a return to step (202). Accordingly, the web crawler ascertains the presence of the geofence and caches this data with the site metadata, and in one embodiment, the caching includes the preferred advertising URL.

Figure 3A:
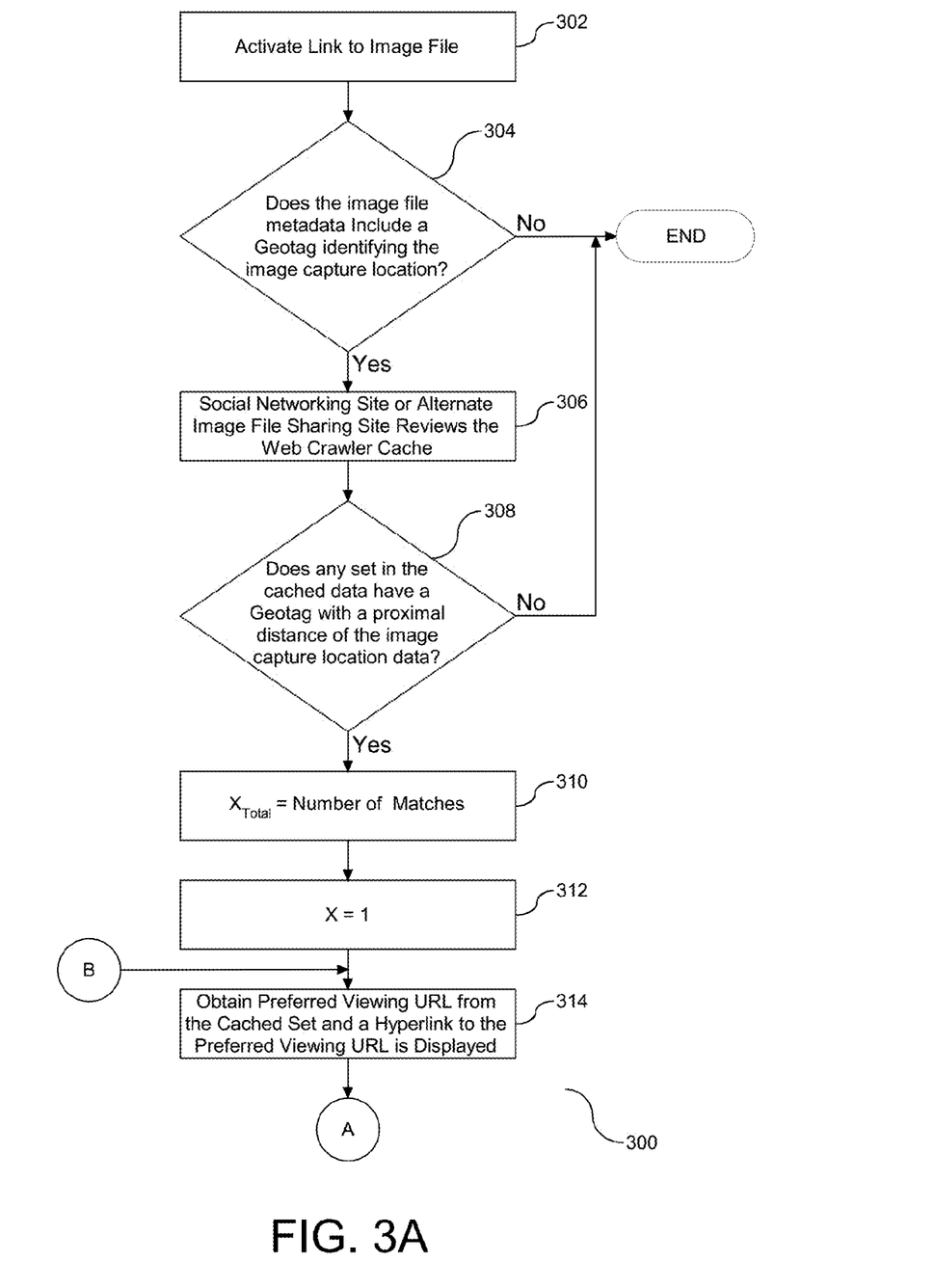
FIGS. 3A and 3B depict a flow chart illustrating a process for linking an image file with a preferred viewing URL based upon the defined entity geofence boundary data.
Figure 3B:
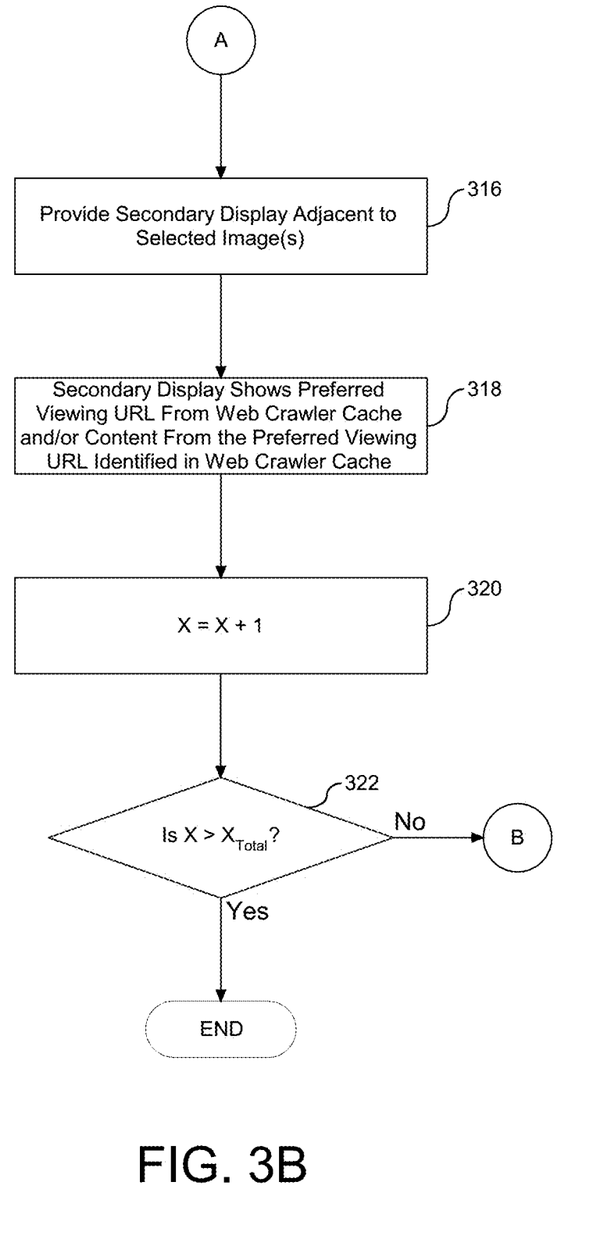

The geofence defines a proximal region associated with the physical location of an entity. At the same time, by defining the geofence of the entity within the associated web site, the geofence becomes part of the data cached by the web crawler, as shown in FIG. 2. Referring to FIGS. 3A and 3B, a flow chart (300) is provided illustrating a process for linking an image file with a preferred viewing URL based upon a defined entity geofence boundary data. Captured image files are frequently posted to social networking sites. In response to activating a link directed to an image file (302), it is determined if the image metadata includes a geotag identifying the image capture location (304). A positive response to the determination at step (304) is followed by the social networking site or alternative image file sharing site reviewing the web crawler cache (306), and determining if there is any set in the cached data that has a geotag within a proximal distance of the image capture location (308). In one embodiment, the image capture location is the location the image was taken, which is identified by geotag coordinates. As explained herein, the geofence boundary is defined by two or more geotag locations. In one embodiment, a match to the image capture location is defined as a geotag that is contained within the boundaries of a cached geofence boundary. Similarly, in one embodiment, a match may be close to the geofence boundary, i.e. within a defined distance of the cached geofence boundary. A positive response to the determination at step (308) is followed by assigning the variable $X_{Total}$ to the number of matches (310) found at step (308), and initializing an associated counting variable, X (312). The preferred viewing URL is then obtained from the cached data set and a hyperlink to the preferred viewing URL is displayed adjacent to the image file (314). The amount of space available for advertising may be limited. Similarly, in one embodiment, the preferred viewing URL is different from the home page URL for the web site.

In addition, a secondary display adjacent to the selected image file is provided on the associated visual display (316). The secondary display can be in the form of a small view of the website identified by the preferred viewing URL, an advertisement of the physical site associated with the geofence, a picture of the physical site, a map, an icon, or any other aspect related to the site associated with the geofence. In one embodiment, the secondary display is an active link that when selected directs the browser to the associated preferred viewing web page identified or otherwise associated with the preferred viewing URL. In one embodiment, the secondary display may be an advertisement. Similarly, in one embodiment, an advertisement is embedded proximal to the image file, with the advertisement being a subset of content from the preferred viewing URL. Accordingly, the secondary display may function as an advertisement for the associated and linked physical entity, with the secondary display being displayed together with the image file, or in one embodiment as an active link to the associated preferred viewing web page.

Following step (318), the matching image counting variable, X, is incremented (320) and it is determined if all of the matching images have been evaluated (322). A negative response to the determination at step (322) is followed by a return to step (314). However, a positive response to the determination at step (322) or a negative response to the determination at any of steps (304) or (308) concludes the image association process. Accordingly, shared image files may be associated with one or more preferred viewing web pages for entities at the location or a within a proximal distance of the location from where the associated image was captured.

The process for association shown and described in FIGS. 3A and 3B is for an image file uploaded to a social networking or image sharing site, and is based upon opening or otherwise accessing the image file(s). In one embodiment, the social networking site may search the file for image metadata and compare any embedded geotag data with cached data from an associated web crawler. For an entity that has a presence on the social networking site, the matching image file may be linked to the entity present on the social networking site.

Figure 4:
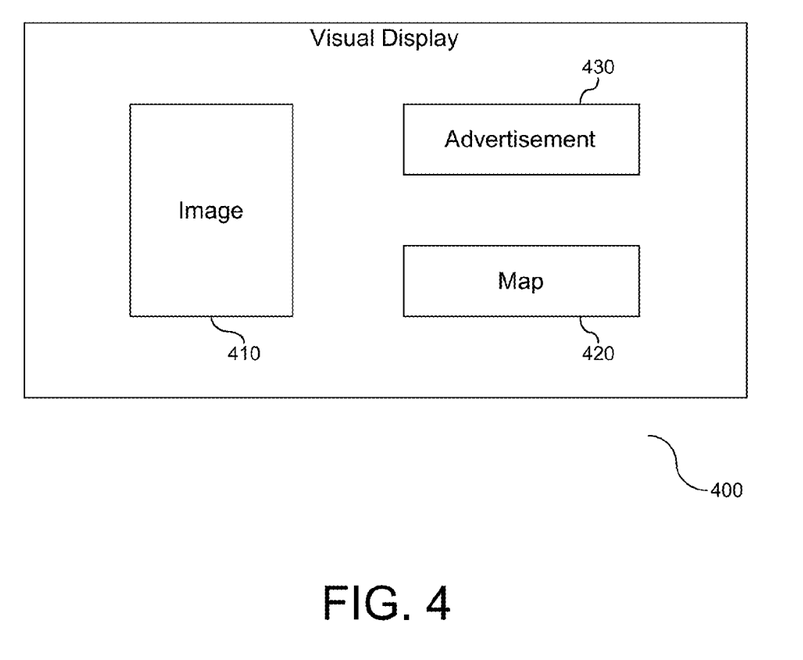
FIG. 4 depicts a block diagram illustrating showing the preferred viewing URL adjacent to an image file that is being viewed.

With the advent of social networking, people are virtually connected for social growth and/or business development. The image and file sharing introduced in FIGS. 1-3 enables the sharing without the established connection, or without the conventional tools to establish a connection. Rather, the sharing is limited and based on image file metadata. Referring to FIG. 4, a block diagram (400) is provided illustrating sharing of the image file showing the preferred viewing URL adjacent to an image file that is being viewed. As shown, the image (410) is presented. Adjacent to the image is a map (420) showing the physical location where the image was captured, which in one embodiment, may also be the subject of the image. In addition, an advertisement (430) is shown. The advertisement also pertains to the location and/or subject of the image (410). Accordingly, the map (420) provides the physical location of the image (410), and the advertisement (430) directs viewers to the physical location of the image (410).

The following is an example of file sharing based on temporal relationships. A user, $user_A$, has a mobile telecommunication device that includes a camera to take pictures, and memory to store the pictures. A processor is embedded in the device to process data, including image data. In addition, the device is configured to communicate with a computing network. $User_A$ takes a picture, $image_A$, and the device creates an image file, $image_A$, which is stored in memory. The processor attaches metadata to the image file. The metadata includes the time the image was capture and the location of the device when the image was captured. This metadata includes a geotag associated with the location of the device when the image was captured. A second user, $user_B$, accesses the image file, and cached data is reviewed and compared to the geotag associated with the image file, $image_A$. A match of the geotag and the cache data is found, and a hyperlink is created to direct $user_B$ to a preferred viewing URL that is associated with the location of the device when the image file was created. The hyperlink is displayed adjacent to the image file. When $user_B$ selects the hyperlink, the web page associated with the URL is shown on the visual display.

In another example, there may be more than one URL associated with the location of the device from where the image was captured. The user, $user_B$, may be presented with two URLs for the image file, each of which a separate hyperlink that may be independently selected. Selection of any one of the hyperlinks will direct the user to a site associated with the URL. The site from the hyperlink may present $user_B$ with a small view of the website identified by the preferred viewing URL, an advertisement of the physical site associated with the geofence, a picture of the physical site, a map, an icon, or any other aspect related to the site associated with the geofence.

Figure 5:
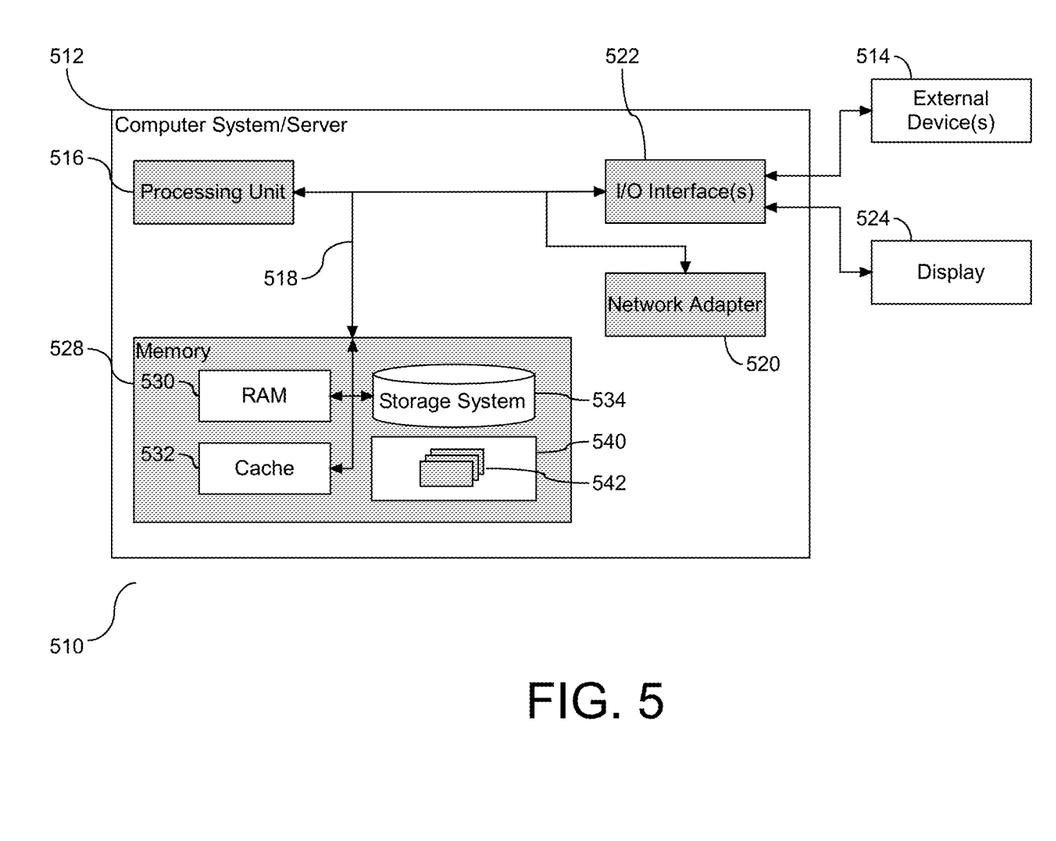
FIG. 5 depicts a block diagram of a computer system/server in a cloud computing node in the form of a general-purpose computing device.

As described in reference to FIGS. 1-3, the device and the associated file sharing functionality may be employed in a shared pool of configurable resources, e.g. a cloud based system. A cloud computing environment is service oriented with a focus on statelessness, low coupling, modularity, and semantic interoperability. At the heart of cloud computing is an infrastructure comprising a network of interconnected nodes. Referring now to FIG. 5, a schematic of an example of a cloud computing node is shown. Cloud computing node (510) is only one example of a suitable cloud computing node and is not intended to suggest any limitation as to the scope of use or functionality of embodiments of the invention described herein. Regardless, cloud computing node (510) is capable of being implemented and/or performing any of the functionalities set forth hereinabove. In cloud computing node (510) there is a computer system/server (512), which is operational with numerous other general purpose or special purpose computing system environments or configurations. Examples of well-known computing systems, environments, and/or configurations that may be suitable for use with computer systems/servers (512) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that includes any of the above systems or devices, and the like.

Computer system/server (512) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (512) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server (512) in cloud computing node (510) is shown in the form of a general-purpose computing device. The components of computer system/server (512) may include, but are not limited to, one or more processors or processing units (516), a system memory (528), and a bus (518) that couples various system components including system memory (528) to processor (516). Bus (518) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (512) typically includes a variety of computer system readable media. Such media may be any available media that is accessible by a computer system/server (512), and it includes both volatile and nonvolatile media, and removable and non-removable media.

System memory (528) can include computer system readable media in the form of volatile memory, such as random access memory (RAM) (530) and/or cache memory (532). Computer system/server (512) may further include other removable/nonremovable, volatile/non-volatile computer system storage media. By way of example only, storage system (534) can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus (518) by one or more data media interfaces. As will be further depicted and described below, memory (528) may include at least one program product having a set (e.g., at least one) of program modules that are configured to carry out the functions of embodiments of the invention.

Program/utility (540), having a set (at least one) of program modules (542), may be stored in memory (528) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the invention as described herein.

Computer system/server (512) may also communicate with one or more external devices (514), such as a keyboard, a pointing device, a display (524), etc.; one or more devices that enable a user to interact with computer system/server (512); and/or any devices (e.g., network card, modem, etc.) that enable computer system/server (512) to communicate with one or more other computing devices. Such communication can occur via Input/Output (I/O) interfaces (522). Still yet, computer system/server (512) can communicate with one or more networks such as a local area network (LAN), a general wide area network (WAN), and/or a public network (e.g., the Internet) via network adapter (520). As depicted, network adapter (520) communicates with the other components of computer system/server (512) via bus (518). It should be understood that although not shown, other hardware and/or software components could be used in conjunction with computer system/server (512). Examples, include, but are not limited to: microcode, device drivers, redundant processing units, external disk drive arrays, RAID systems, tape drives, and data archival storage systems, etc.

Figure 6:
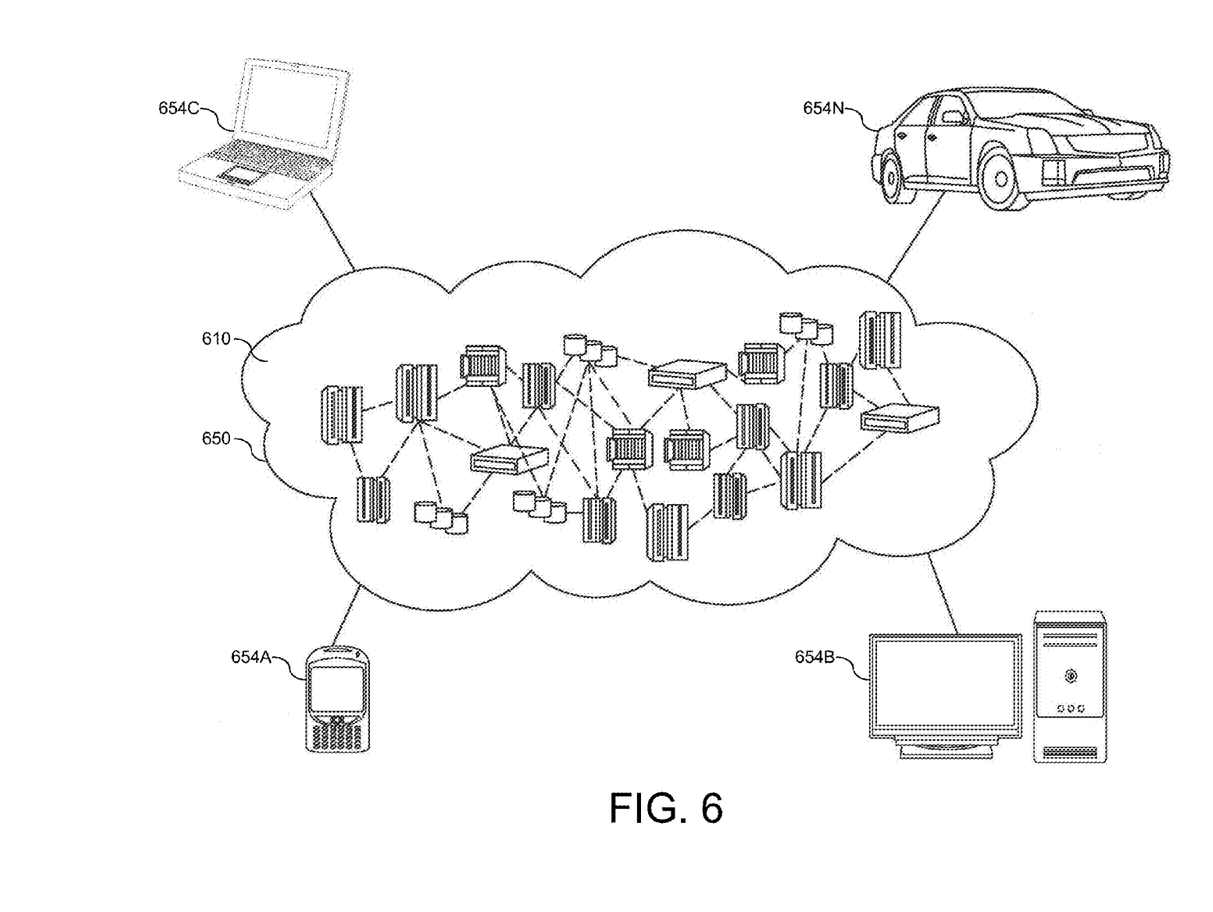
FIG. 6 depicts a block diagram of a cloud computing environment.

Referring now to FIG. 6, illustrative cloud computing environment (650) is depicted. As shown, cloud computing environment (650) comprises one or more cloud computing nodes (610) with which local computing devices used by cloud consumers, such as, personal digital assistant (PDA) or cellular telephone (654A), desktop computer (654B), laptop computer (654C), and/or automobile computer system (654N) may communicate. Nodes (610) may communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (654A)-(654N) shown in FIG. 6 are intended to be illustrative only and that computing nodes (610) and cloud computing environment (650) can communicate with any type of computerized device over any type of network and/or network addressable connection (e.g., using a web browser).

Figure 7:
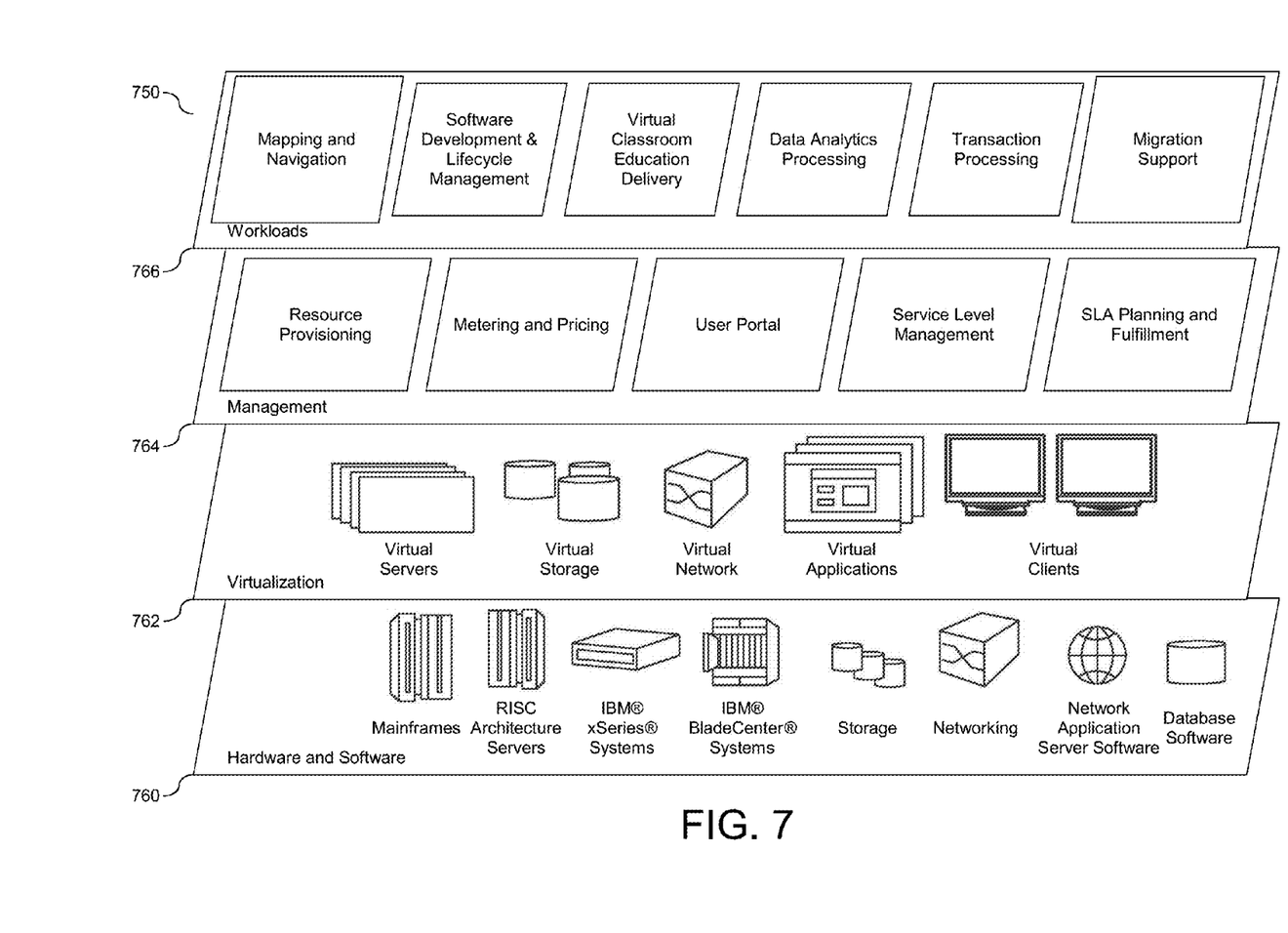
FIG. 7 depicts a block diagram of a set of functional abstraction layers provided by the cloud computing environment.

Referring now to FIG. 7, a set of functional abstraction layers provided by cloud computing environment (750) is shown. It should be understood in advance that the components, layers, and functions shown in FIG. 7 are intended to be illustrative only and embodiments of the invention are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, and service level management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. In the shared pool of configurable computer resources described herein, hereinafter referred to as a cloud computing environment, files may be shared among users within multiple data centers, also referred to herein as data sites. An example of workloads and functions which may be provided from this layer includes, but is not limited to, organization and management of data objects within the cloud computing environment and file sharing based on temporal relationships. In the shared pool of configurable computer resources described herein, hereinafter referred to as a cloud computing environment, files may be shared among users within multiple data centers, also referred to herein as data sites. A series of mechanisms are provided within the shared pool to provide organization and management of data storage. Accordingly, a series of mechanisms are provided within the shared pool to support organization and management of data storage within the cloud computing environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of image acquisition, including embedding of metadata within the image file(s), is directed to sharing of image files in a shared pool of configurable resources based on geographic metadata.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
accessing an image file, the image file including image capture location data defining a device location capturing the image file, the image capture location data stored as metadata associated with the image file;
analyzing an array of cached data, each entry in the array having a set of geotag boundary values defining a geofence for an entity;
comparing the image file capture location data with at least one entity geotag boundary value identified in the array;
responsive to a match from the comparison, creating a hyperlink of a preferred viewing URL for directing a viewer from the image file to the preferred viewing URL; and
creating a single view, the single view including:
the created hyperlink proximal to the image file;
embedding an advertisement proximal to the image file, wherein the advertisement pertains to at least one of a physical location associated with the image and a subject of the image; and
a map of the location of the device capturing the image file.

2. The method of claim 1, further comprising selecting the hyperlink, the selection embedding a compact version of a web site associated with the preferred viewing URL in the single view.

3. The method of claim 1, wherein the advertisement is the preferred viewing URL.

4. The method of claim 1, wherein the advertisement is a subset of content from the preferred viewing URL.

5. The method of claim 1, wherein the image file, the advertisement, and the created hyperlink are adjacently positioned.

6. The method of claim 1, further comprising:
uploading the image file to a data storage by a first uploading entity; and
wherein accessing the image file is performed by an accessing entity, and the uploading entity and the accessing entity are different.

7. A computer program product comprising a computer readable storage device having program code embodied therewith, the program code executable by a processor to:
access an image file, the image file including image capture location data defining a device location capturing the image file, the image capture location data stored as metadata associated with the image file;
analyze an array of cached data, each entry in the array having a set of geotag boundary values, the values defining a geofence for an entity;
compare the image file capture location data with at least one entity geotag boundary value identified in the array;
responsive to a match from the comparison, create a hyperlink of a preferred viewing URL to direct a viewer from the image file to the preferred viewing URL; and
creating a single view, the single view including:
the created hyperlink proximal to the image file;
an advertisement proximal to the image file, wherein the advertisement pertains to at least one of a physical location of the image and a subject of the image; and
a map of the location of the device capturing the image file.

8. The computer program product of claim 7, further comprising program code to select the created hyperlink, including embed a compact version of a web site associated with the preferred viewing URL in the single view.

9. The computer program product of claim 7, wherein the advertisement is the preferred viewing URL.

10. The computer program product of claim 7, wherein the advertisement is a subset of content from the preferred viewing URL.

11. A system comprising:
a processing unit in communication with memory;
an electronic image file, the image file including image capture location data defining a device location capturing the image file, the image capture location data stored as metadata associated with the image file;
in response to access of the image file, a director, in communication with the processing unit, to analyze an array of cached data, each entry in the array having a set of geotag boundary values, the values defining a geofence for an entity; and
an image manager to compare the image file capture location data with at least one entity geotag boundary value identified in the array, and in response to a match produced by the comparison, the image manager to create a hyperlink of a preferred viewing URL to direct the image file to the preferred viewing URL and creating a single view, including:
the created hyperlink proximal to the image file;
an advertisement proximal to the image file, wherein the advertisement pertains to at least one of a physical location associated with the image and a subject of the image; and
a map of the location of the device capturing the image file.

12. The system of claim 11, further comprising selection of the hyperlink, the selection to embed a compact version of a web site associated with the preferred viewing URL in the single view.

13. The system of claim 11, wherein the advertisement is the preferred viewing URL.

14. The system of claim 11, wherein the advertisement is a subset of content from the preferred viewing URL.

\* \* \* \* \*